(No Model.)
W. A. PATERSON.
FIFTH WHEEL.
No. 490,452. Patented Jan. 24, 1893.
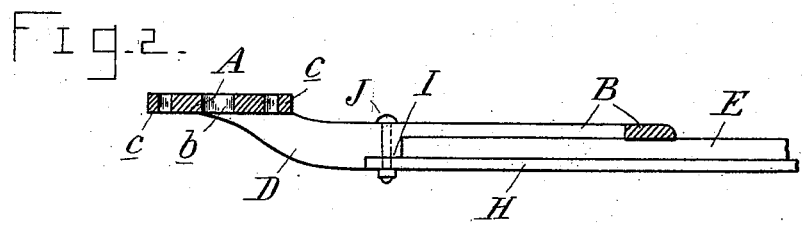
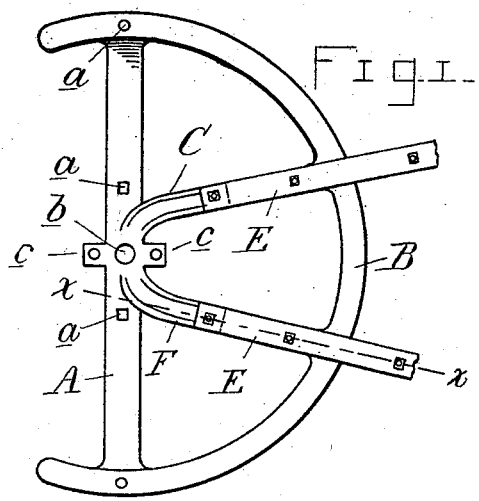
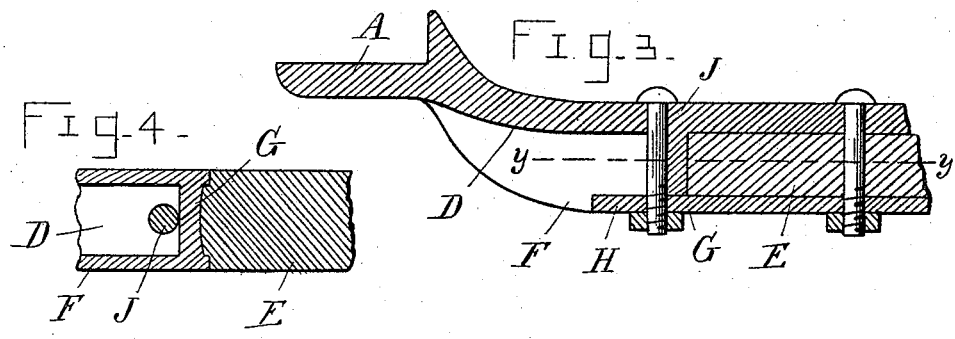
Witnesses:
Otto F. Barthel
N. L. Lindop
Inventor,
William A. Paterson,
By Thos. S. Sprague & Son
Attys.

UNITED STATES PATENT OFFICE.

WILLIAM A. PATERSON, OF FLINT, MICHIGAN.

FIFTH-WHEEL.

SPECIFICATION forming part of Letters Patent No. 490,452, dated January 24, 1893.

Application filed August 10, 1892. Serial No. 442,670. (No model.)

*To all whom it may concern:*

Be it known that I, WILLIAM A. PATERSON, a citizen of the United States, residing at Flint, in the county of Genesee and State of Michigan, have invented certain new and useful Improvements in Fifth-Wheels for Vehicles, of which the following is a specification, reference being had therein to the accompanying drawings.

This invention relates to new and useful improvements in fifth wheels for vehicles, and the invention consists in the peculiar construction of the parts whereby I combine the head plate, circle bar and perch irons in a single casting, or as an integral whole, having securing means for the reach on the under side of the perch iron between the circle bar and head plate, and further in the peculiar construction, arrangement and combination of the various parts, all as more fully hereinafter described.

In the drawings, Figure 1 is bottom plan view of my improved fifth wheel. Fig. 2 is a vertical, central section thereof. Fig. 3 is a cross section on line $x$ $x$ in Fig. 1. Fig. 4 is a horizontal section on line $y$ $y$, Fig. 3.

A is the head plate, preferably slightly curved on its upper surface in the usual manner and having formed integral therewith or by securing to its ends the circle bar B, extending rearward and having the usual flat bearing surface on its under side. The head plate connects to the top of the circle bar, so that the circle bar is lower than the head plate the thickness of the former. The head plate is provided with suitable apertures $a$, by means of which it may be bolted to the bolster and aperture $b$ for the king bolt and apertured lugs $c$ at each side of the central aperture for the ends of the clip for securing it to the bolster.

C are the perch irons, preferably cast integral with the circle bar and head plate and extending rearward from the circle bar in the same plane as the circle bar, as plainly shown in Fig. 2, having the curved portion D at the forward end connecting with the head plate. It will be seen that in this construction the perch irons and circle bar are in the same plane and both are a suitable distance below the head-plate upon the forward end of the perch irons. On the under side I form securing devices for the reaches E. These devices consist of the downward extending flanges F connected at their rear ends by means of the cross-bar G against which cross bar the forward end of the reach abuts.

H is a connecting plate secured to the under side of the reach and extending beyond the forward end thereof into a gain I formed in the lower rear edge of the flanges F.

J is a bolt passing through the perch iron in front of the cross-bar G and through the connecting plate H firmly securing the perch irons and reach together.

In vehicles of this class heretofore where drop perches have been used it is usually necessary to brace them from the under side of the axle and to make them of considerable weight to resist the strains to which they are subjected because of their otherwise unsupported condition.

With my construction in forming the head plate, circle bar and perch irons integral in one piece and securing the reach to the under side of the perch irons extending almost to the head plate, the whole when assembled makes a structure which is light and strong, which gives me ample room for the vertical movement of the body as the circle bar is the highest point in rear of the axle and which greatly reduces the expense of manufacture, as well as simplifies the structure.

The draft from the reach is applied through the neck and plate H and bolt J, which bolt bears directly with its rear face against the cross-bar G preventing any possibility of rattling or end movement rearward, while the front of the reach itself bears against the cross bar G and prevents any possibility of forward movement, the whole being firmly bolted together.

What I claim as my invention is:

1. In a vehicle, a fifth wheel comprising the head plate A, circle bar B, the perch irons C formed integral with and connected at their opposite ends respectively to the head plate, and circle bar, the reach, and securing means for the reach on the under side of the perch irons at the forward end thereof, substantially as described.

2. In a vehicle, a fifth wheel comprising a head plate, a circle bar depending below the ends thereof, the perch irons extending from the head plate to and connected with the circle bar and consisting of the curved portion D and horizontal portion C arranged in the plane of the circle bar, the whole being formed in one integral piece, the reach on the under side of the perch irons, and means for securing the reach to the perch irons near the forward end thereof, substantially as described.

3. In a vehicle, a fifth wheel comprising the head plate, the circle bar and perch irons the latter extending from the plate to the bar and formed integral in one piece, the perch irons extending rearward in the plane of the circle bar, the reach, the connecting plate H on the reach, the flanges F at the forward end of the perch irons, cross-bar G at the rear end of said flanges, the bolt J passing through the perch irons and connecting plate in front of said cross-bar, substantially as described.

In testimony whereof I affix my signature in presence of two witnesses.

WILLIAM A. PATERSON.

Witnesses:
N. L. LINDOP,
JAMES WHITTEMORE.